United States Patent [19]

Bogath

[11] 4,383,739

[45] May 17, 1983

[54] MICROSCOPE OBJECTIVE

[75] Inventor: Walter J. Bogath, Vienna, Austria

[73] Assignee: C. Reichert Optische Werke, AG, Vienna, Austria

[21] Appl. No.: 320,644

[22] Filed: Nov. 12, 1981

[51] Int. Cl.³ .............................................. G02B 21/02
[52] U.S. Cl. ...................................................... 350/414
[58] Field of Search .............................. 350/414, 478

[56] References Cited

U.S. PATENT DOCUMENTS

| | | | |
|---|---|---|---|
| 3,355,234 | 11/1967 | Muller | 350/414 |
| 3,552,831 | 1/1971 | Shoemaker | 350/414 |
| 3,893,751 | 7/1975 | Shoemaker | 350/414 |
| 3,893,752 | 7/1975 | Tojyo | 350/414 |

FOREIGN PATENT DOCUMENTS 925012   5/1963   United Kingdom ................ 350/478

*Primary Examiner*—John K. Corbin
*Assistant Examiner*—Scott J. Sugarman
*Attorney, Agent, or Firm*—Alan H. Spencer

[57]  ABSTRACT

A component microscope objective has a numerical aperture of 0.80. When used with a telescope as described in U.S. Pat. No. 3,355,234, the objective provides a magnification of 63X in an embodiment having a focal length of 2.90 and is well corrected for the usual chromatic image aberrations, spherical aberration, coma and astigmatism.

2 Claims, 1 Drawing Figure

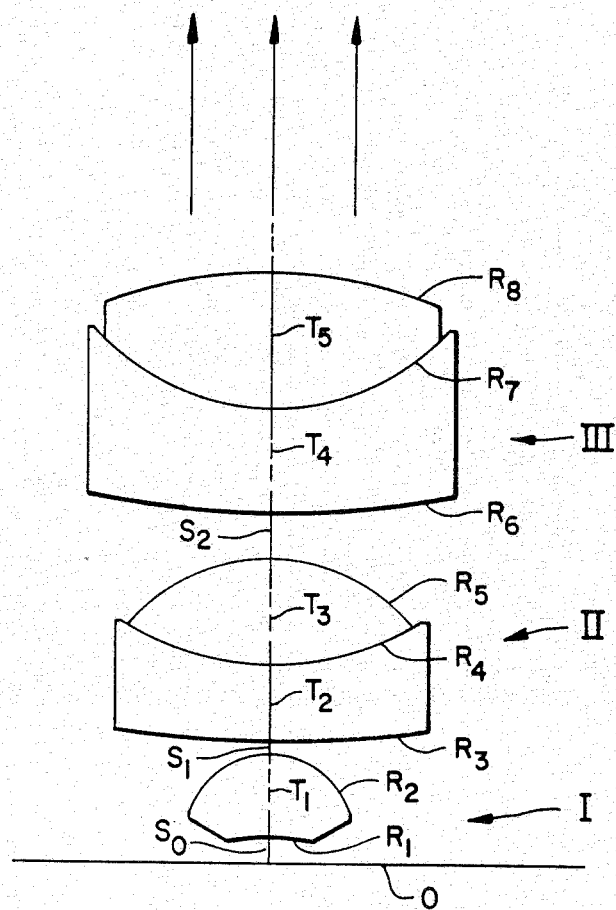

MICROSCOPE OBJECTIVE

BACKGROUND OF THE INVENTION

This invention relates to microscope objectives and more particularly to microscope objectives having a numerical aperture of substantially 0.80 and a magnification of 63X, when used with a telescope objective as described in U.S. Pat. No. 3,355,234 and having a focal length of 2.90.

Microscope objectives according to this invention are well corrected for the usual chromatic image aberrations, spherical aberration, coma and astigmatism when used with a telescope objective.

U.S. Pat. Nos. 3,552,831 issued Jan. 5, 1971 and 3,893,751 issued July 8, 1975 disclose a 40X objective having a concavo-convex singlet followed by two biconvex doublets with an N.A. of 0.66. There are substantial differences in the values of the reference objectives of the present invention.

U.S. Pat. No. 3,893,752 issued July 8, 1975 also discloses a 40X objective although having an N.A. of 0.65. The values of the various components differ substantially from the values of the presently claimed objective.

DESCRIPTION OF THE DRAWING AND INVENTION

The drawing is an optical diagram of an embodiment of the present invention.

Referring to the drawing, objective XX is shown in a view transverse to its optical axis relative to object plano O and illustrates the lens components aligned along the optical axis. The first component I of objective XX is a concavo-convex positive singlet, the second component II is a biconvex positive doublet and the third component III is a biconvex positive doublet.

The parameters of objectives according to the present invention are set forth in Table I, wherein successive axial spaces are identified as $S_0$ to $S_3$ and axial thicknesses of successive lens elements are identified as $T_1$ to $T_5$. The radii of successive lens surfaces are designated $R_1$ to $R_8$ with the minus sign (−) being applied to the radius of a surface whose center of curvature lies on the object side of its vertex. The refractive indices and Abbe numbers of the successive lenses are absolute values designated $ND_1$ to $ND_5$ and $\nu_1$ to $\nu_5$ successively.

TABLE I

| Lens | Radius (R) | Thickness (T) | Spacing (S) | Refractive Index (ND) | Abbe No ($\nu$) |
|---|---|---|---|---|---|
| | | | $S_0 = 0.145F$ | | |
| I | $R_1 = -1.3146F$ | $T_1 = 0.493F$ | | $1.57 < ND_1 < 1.59$ | $40 < \nu_1 < 43$ |
| | $R_2 = -0.4722F$ | | | | |
| | | | $S_1 = 0.083F$ | | |
| | $R_3 = 14.1638F$ | $T_2 = 0.448F$ | | $1.69 < ND_2 < 1.71$ | $29 < \nu_2 < 31$ |
| II | $R_4 = 1.6426F$ | $T_3 = 0.603F$ | | $1.51 < ND_3 < 1.53$ | $58 < \nu_3 < 60$ |
| | $R_5 = -1.0786F$ | | | | |
| | | | $S_2 = 0.283F$ | | |
| | $R_6 = 9.1369F$ | $T_4 = 0.569F$ | | $1.68 < ND_4 < 1.70$ | $30 < \nu_4 < 32$ |
| III | $R_7 = 1.4063F$ | $T_5 = 0.783F$ | | $1.51 < ND_5 < 1.53$ | $64 < \nu_5 < 66$ |
| | $R_8 = -2.7814F$ | | | | | wherein F is about 2.5 to 3.5 mm.

The values of a preferred embodiment of the present invention is set forth in the following table.

TABLE II

| Lens | Radius (R) | Thickness (T) | Spacing (S) | Refractive Index (ND) | Abbe No ($\nu$) |
|---|---|---|---|---|---|
| | | | $S_0 = 0.42$ | | |
| I | $R_1 = -3.8123$ | $T_1 = 1.43$ | | $ND_1 = 1.578$ | $\nu_1 = 41.58$ |
| | $R_2 = -1.3694$ | | | | |
| | | | $S_2 = 0.24$ | | |
| | $R_3 = 41.075$ | $T_2 = 1.30$ | | $ND_2 = 1.699$ | $\nu_2 = 30.06$ |
| II | $R_4 = 4.7635$ | $T_3 = 1.75$ | | $ND_3 = 1.518$ | $\nu_3 = 58.98$ |
| | $R_5 = -3.1279$ | | | | |
| | | | $S_3 = 0.82$ | | |
| | $R_6 = 26.497$ | $T_4 = 1.65$ | | $ND_4 = 1.689$ | $\nu_4 = 31.17$ |
| III | $R_7 = 4.0782$ | $T_5 = 2.27$ | | $ND_5 = 1.518$ | $\nu_5 = 65.04$ |
| | $R_8 = -8.066$ | | | | |

I claim:

1. A microscope objective which is well corrected for chromatic image aberrations, spherical aberration, coma and astigmatism and has three elements aligned along an optical axis, which comprises a concavo-convex positive singlet I as a first element, a double convex positive doublet II as a second element and a double convex positive doublet III as a third element, said elements having the following optical parameters.

| Lens | Radius (R) | Thickness (T) | Spacing (S) | Refractive Index (ND) | Abbe No ($\nu$) |
|---|---|---|---|---|---|
| | | | $S_0 = 0.145F$ | | |
| | $R_1 = -1.3146F$ | | | | |
| I | | $T_1 = 0.493F$ | | $1.57 < ND_1 < 1.59$ | $40 < \nu_1 < 43$ |
| | $R_2 = -0.4722F$ | | | | |
| | | | $S_1 = 0.083F$ | | |
| | $R_3 = 14.1638F$ | | | | |
| | | $T_2 = 0.448F$ | | $1.69 < ND_2 < 1.71$ | $29 < \nu_2 < 31$ |
| II | $R_4 = 1.6426F$ | | | | |
| | | $T_3 = 0.603F$ | | $1.51 < ND_3 < 1.53$ | $58 < \nu_3 < 60$ |
| | $R_5 = -1.0786F$ | | | | |
| | | | $S_2 = 0.283F$ | | |
| | $R_6 = 9.1369F$ | | | | |
| | | $T_4 = 0.569F$ | | $1.68 < ND_4 < 1.70$ | $30 < \nu_4 < 32$ |
| III | $R_7 = 1.4063F$ | | | | |
| | | $T_5 = 0.783F$ | | $1.51 < ND_5 < 1.53$ | $64 < \nu_5 < 66$ |
| | $R_8 = -2.7814F$ | | | | | wherein F is about 2.5 to 3.5 mm.

2. The microscope objective of claim 1 wherein F is 2.90 mm, $ND_1$ is 1.578, $ND_2$ is 1.699, $ND_3$ and $ND_5$ are 1.518, $ND_4$ is 1.689, $\nu_1$ is 41.58, $\nu_2$ is 30.06, $\nu_3$ is 58.98, $\nu_4$ is 31.17 and $\nu_5$ is 65.04.

* * * * *